(No Model.)

E. T. MASON.
PACKING BARREL.

No. 521,804. Patented June 26, 1894.

Witnesses
S. L. C. Hasson
W. A. Simmons

Inventor
Edgar T. Mason.
By his Attorney
Rich'd H. Manning

UNITED STATES PATENT OFFICE.

EDGAR T. MASON, OF KANSAS CITY, MISSOURI.

PACKING-BARREL.

SPECIFICATION forming part of Letters Patent No. 521,804, dated June 26, 1894.

Application filed July 19, 1893. Serial No. 480,962. (No model.)

*To all whom it may concern:*

Be it known that I, EDGAR T. MASON, a citizen of the United States, residing at Kansas City, in the county of Jackson and State of Missouri, have invented a certain new and useful Improvement in Packing-Barrels; and I do hereby declare that the following is a full, clear, and exact description thereof, such as will enable others to make and use the same, reference being had to the accompanying drawings, forming a part of this specification.

The object of my invention is to prevent the injury to apples, pears, and the like by being bruised and consequently subject to immediate decay, after having been once carefully packed and which subsequently by shrinkage are reduced in size and free to move about in the unoccupied space within the barrel.

Figure 1:
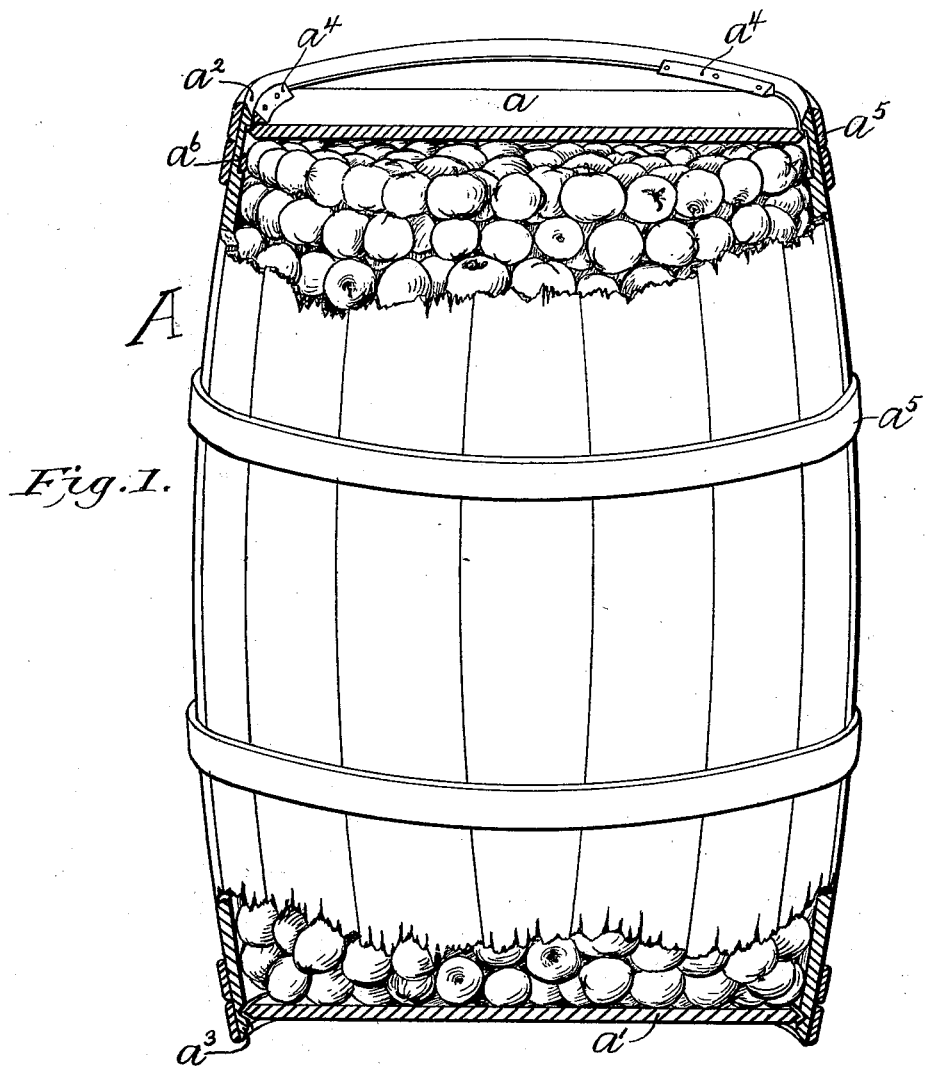
Figure 2:
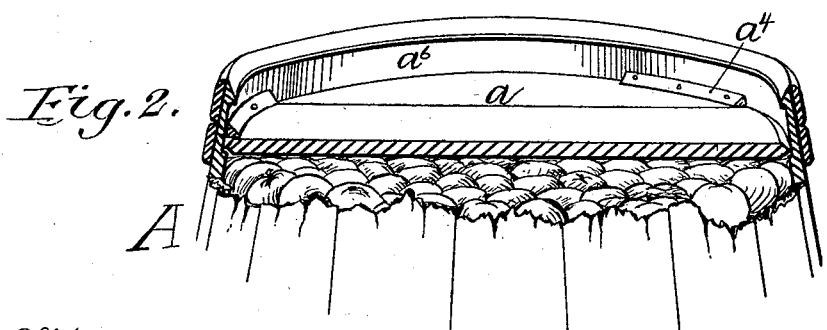

In the drawings, Figure 1 is a front elevation of a packing barrel with a portion of the upper and lower ends and side broken away showing the contents of the barrel, the wide groove, and the head within the upper portion of the groove in a position before shrinkage of the contents of the barrel. Fig. 2 is a detail view of the upper portion of the barrel as seen in Fig. 1, showing the contents of the barrel after shrinkage has taken place and the head of the barrel in the lower portion of the groove and occupying the position within the limits of the unoccupied space.

Referring to the drawings, A. represents a packing barrel, such as is commonly used for storing flour, apples, &c. $a$, represents one end and $a'$ the other end of the barrel. On the inner side of the barrel a short distance below the upper edge is made a wide annular groove $a^6$ which extends around the inner side of the barrel, for the proper declension of the head and in depth nearly one half of the described thickness of the side of the barrel. Within the groove $a^6$ is fitted the end or annular head $a$ of the barrel which is circular in form and extends within the groove $a^6$ and close in position to the vertical sides of said groove. Removably secured to the inner side of the barrel, above the end or head $a$, are short curved strips or liners $a^4$. The other end of the barrel may be constructed in the same manner, if preferred.

In packing perishable goods, such as apples, the barrel A, is filled with the fruit and then shaken so as to fill all interstices, after which the end or head $a$ is placed in position in the groove $a^6$, the liners $a^4$ are secured in place above the end of the barrel, and the hoops $a^5$ at the upper end of the barrel are driven in a downward direction so as to clamp the sides and end of the barrel closely together. In course of time the evaporation of the fruit causes it to shrink and the fruit settles within the barrel, so as to leave above the fruit and the inner side of the end $a$, (the barrel being in the position as seen in Fig. 1) an unoccupied space varying according to shrinkage. When the barrel is moved and turned upon the side the fruit being unconfined falls in whatever direction the space presents itself and becomes bruised in contact with each other, and decay is the result. Whenever shrinkage takes place the said end $a$, is forced in a downward direction toward and upon the fruit in the barrel. The liners are then secured to the inner side of the barrel within the groove $a^6$ and against the outer side of said end. The fruit is thus prevented from further movement and the great loss by decay avoided. This also saves the repacking of the fruit and enables the space to be taken up without removing the end or head of the barrel or even loosening the hoops $a^5$; it being observed that the movement of the end $a$, is but slightly resisted, and at the same time retained within the limits of the groove. In ordinary cases the tightening of the hoops of the barrel will retard and prevent the head or end from upward movement, when the liners are not used.

Having fully described my invention, what I now claim as new, and desire to secure by Letters Patent, is—

A packing barrel having hoops and a wide annular groove in its inner side, near the upper edge for receiving an annular head and means for retarding the movements of said head within the limits of the groove substantially as described.

EDGAR T. MASON.

Witnesses:
S. L. C. HASSON,
H. R. TOMLINSON.